United States Patent
Kaus et al.

(10) Patent No.: US 7,421,122 B2
(45) Date of Patent: Sep. 2, 2008

(54) SIMULTANEOUS SEGMENTATION OF MULTIPLE OR COMPOSED OBJECTS BY MESH ADAPTATION

(75) Inventors: Michael Kaus, Hamburg (DE); Jürgen Weese, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 290 days.

(21) Appl. No.: 10/521,182

(22) PCT Filed: Jul. 15, 2003

(86) PCT No.: PCT/IB03/02795

§ 371 (c)(1),
(2), (4) Date: Nov. 2, 2005

(87) PCT Pub. No.: WO2004/010374

PCT Pub. Date: Jan. 29, 2004

(65) Prior Publication Data

US 2006/0110037 A1 May 25, 2006

(30) Foreign Application Priority Data

Jul. 19, 2002  (EP)  .................. 02016060

(51) Int. Cl.
  *G06K 9/34* (2006.01)
  *G06K 9/00* (2006.01)
  *G06K 9/46* (2006.01)
  *G06F 17/00* (2006.01)

(52) U.S. Cl. ............... 382/173; 382/128; 382/190; 345/418

(58) Field of Classification Search ......... 382/128–132, 382/173–181, 190; 345/418–420, 619–624, 345/629–634, 648–666
See application file for complete search history.

(56) References Cited

U.S. PATENT DOCUMENTS

| | | | | |
|---|---|---|---|---|
| 5,886,702 A | * | 3/1999 | Migdal et al. | 345/423 |
| 5,945,996 A | * | 8/1999 | Migdal et al. | 345/420 |
| 6,169,817 B1 | * | 1/2001 | Parker et al. | 382/131 |
| 6,246,784 B1 | * | 6/2001 | Summers et al. | 382/128 |
| 6,342,886 B1 | * | 1/2002 | Pfister et al. | 345/424 |
| 6,345,112 B1 | * | 2/2002 | Summers et al. | 382/128 |
| 6,396,492 B1 | * | 5/2002 | Frisken et al. | 345/420 |
| 6,480,190 B1 | * | 11/2002 | Pfister et al. | 345/419 |
| 6,498,607 B1 | * | 12/2002 | Pfister et al. | 345/423 |

(Continued)

OTHER PUBLICATIONS

C.-W. Liao and G. Medioni, Simultaneous Surface Approximation and Segmentation of Complex Objects, Computer Vision and Image Understanding, vol. 73, Issue 1, Jan. 1, 1999, pp. 43-63.*

(Continued)

*Primary Examiner*—Bhavesh Mehta
*Assistant Examiner*—Manav Seth

(57) ABSTRACT

Deformable models are used for the segmentation of structures in 3D images. The basic principle of such methods consists of the adaptation of flexible meshes to the image. However, the simultaneous segmentation of multiple or composed objects often causes problems in that spatial relationships between the objects are violated, or that meshes are intersecting each other. According to the present invention, a priori knowledge about spatial relationships between objects is introduced into the shaped model. This allows to maintain spatial relationships between the objects and to avoid intersecting meshes.

18 Claims, 4 Drawing Sheets

U.S. PATENT DOCUMENTS

| | | | | |
|---|---|---|---|---|
| 6,970,171 | B2* | 11/2005 | Baraff et al. | 345/473 |
| 7,200,251 | B2* | 4/2007 | Joshi et al. | 382/128 |
| 2003/0088389 | A1* | 5/2003 | Balaniuk et al. | 703/2 |
| 2006/0098007 | A1* | 5/2006 | Rouet et al. | 345/419 |

OTHER PUBLICATIONS

Shape Constrained Deformable Models for 3D Medical Image Segmentation, Lecture Notes in Computer Science, vol. 2082/2001, Information Processing in Medical Imaging: 17th International Conference, IPMI 2001, Davis, CA, USA, Jun. 18-22, 2001, Proceedings, Jürgen Weese, Michael Kaus, Christian Lorenz, Steven Lobregt, Roe Truyen and Vladimir Pekar.*

Chia-Wei Liao, et al; Simultaneous Surface Approximation and Segmentation of Complex Objects, vol. 73, No. 1, Jan. 1999, pp. 43-63, XP004444647.

Tim McInerney, et al; Deformable Models in Medical Image Analysis, IEEE Comput, Jun. 1996, pp. 171-180, XP001179897.

Bardinet E. et al: A Parametric Deformable Mosel to Fit Unstructured 3D Data, vol. 71, No. 1, Jul. 1998, pp. 39-54, XP004448868.

Vladimir Pekar, et al: Shape Model Based Adaptation of 3-D Deformable Meshes for Segmentation of Medical Images, SPIE, 2001, vol. 4322, pp. 281-289.

Ricardo Toledo, et al: Eigensnakes for Vessel Segmentation in Angiography, IEEE 2000, pp. 340-343.

Laurent D. Choen, Auxiliary Variables and Two-Step Iterative Algorithms in Computer Vision Problems, vol. 6, 1996, pp. 59-83.

* cited by examiner

SIMULTANEOUS SEGMENTATION OF MULTIPLE OR COMPOSED OBJECTS BY MESH ADAPTATION

The present invention relates to a method for the simultaneous segmentation of multiple or composed objects in an image. Furthermore, the present invention relates to an image processing device adapted for executing the method for the simultaneous segmentation of multiple or composed objects in an image and a computer program comprising instruction code for executing the method for the simultaneous segmentation of multiple or composed objects.

Segmentation methods are used to derive geometric models of, for example, organs or bones from volumetric image data, such as CT, MR or US images. Such geometric models are required for a variety of medical applications, or generally in the field of pattern recognition. For medical or clinical applications, an important example is cardiac diagnosis, where geometric models of the ventricles and the myocard of the heart are required for perfusion analysis, wall motion analysis and computation of the ejection fraction. Another important clinical application is radio-therapy planning, where the segmentation of multiple organs and bones in, for example, the prostrate region (femur heads, rectum, prostate, bladder) is necessary for the diagnosis and/or for the determination of treatment parameters.

Deformable models are a very general class of methods for the segmentation of structures in 3D images. Deformable models are known, e.g. from an article of T. McInerney et al. "Deformable models in medical image analysis: A survey", Medical Image Analysis, 1(2):91-108, 1996.

The basic principle of deformable models consist of the adaptation of flexible meshes, represented, for example, by triangles or simplexes, to the object of interest in an image. For this, the model is initially placed near or on the object of interest in the image. This may be done by a user. Then, coordinates of surface elements of the flexible mesh, such as the triangles, are iteratively changed until they lie on or close to the surface of the object of interest. Such a method is described in further detail in J. Weese et al. "Shape constrained deformable models for 3D medical image segmentation" in $17^{th}$ International Conference on Information Processing in Medical Imaging (IPMI), pages 380-387, Davies, Calif., USA, 2001, Springer Verlag.

Usually, several separate structures of interest, such as the femur head, the rectum, the prostate and the bladder in the prostate region, have to be segmented Also, it often occurs that the structure of interest consists of several objects, such as two vertebra of the spine. In spite of having a certain spatial configuration, often, these objects are not connected. In such cases, adaptation may become a problem.

If a plurality of objects are segmented one after the other, a correct segmentation of the individual objects is often not possible. It often occurs that the spatial relationship between the objects, for example, a minimum distance between two object boundaries cannot be maintained.

It is also possible to carry out the segmentation process simultaneously for all objects. This can be done, for example, for reasons of speed and practicality. However, during a simultaneous segmentation of a plurality of objects, it often occurs that the spatial relationships are not maintained and are violated during mesh reconfiguration. This causes meshes which are intersecting or too close to each other, thus resulting in a wrong segmentation result.

Accordingly, it is an object of the present invention to provide a method for the simultaneous segmentation of multiple or composed objects in an image which allows an improved simultaneous segmentation of multiple or composed objects.

The above object is solved by a method for the simultaneous segmentation of multiple or composed objects in an image, wherein a deformable surface model is to be adapted to a first surface of a first object and a second surface of a second object and wherein the deformable surface model comprises a first partial deformable surface model and a second partial deformable surface model, comprising the steps of:

(a) applying the first partial deformable surface model describing a structure of the first surface of the first object;

(b) applying the second partial deformable surface model describing a structure of the second surface of the second object, wherein the first partial deformable surface model and the second partial deformable surface model have a prescribed spatial relationship corresponding to a spatial relationship of the first object and the second object; and (c) adapting the first partial deformable model to the first surface and the second partial deformable model to the second surface, wherein the prescribed spatial relationship of the first partial deformable surface model and the second partial deformable surface model is used for the adaptation.

In other words, in this method according to an exemplary embodiment according to the present invention, a priori knowledge of a spatial relationship of the first and second objects is used for adaptation. Advantageously, this method according to an exemplary embodiment of the present invention allows to carry out a simultaneous segmentation while maintaining spatial relationships between a plurality of objects during mesh configuration. Advantageously, this avoids intersecting meshes and/or meshes which are too close to each other.

According to an exemplary embodiment of the present invention as set forth in claim 2, the step of applying a priori knowledge of the spatial relationship of the first and second objects for adaptation in accordance with step (c) of claim 1, involves the use of an additional edge connecting the surfaces of the two deformable surface models, or a plurality of additional edges which are connecting vertices of the two deformable surface models. The method according to claim 2 provides a simple methods which can be executed with a minimized computation effort. Furthermore, the use of additional edges can be integrated without further amendments into other segmentation methods, such as the one known from J. Weese et al.

According to another exemplary embodiment of the present invention as set forth in claim 3, the additional edge between objects is a featureless triangle. This means that assuming a mesh with triangles, an additional triangle is defined between a vertex of the first deformable surface model and a vertex of the second deformable surface model. The additional triangle is introduced such that when numbering the vertices of the triangle with 1, 2, 3, the vertices 1 and 3 of the additional triangle are identical. Thus, the additional triangle does not have any surface. Accordingly, this additional triangle does not contribute to a calculation of an external energy during segmentation. The motivation for no external energy (i.e. not searching for a surface feature) is that a connection between two deformable surface model does not correspond to an object surface.

Further exemplary embodiments according to the present invention, as set forth in claims 4 and 5 provide, for a fast and efficient simultaneous segmentation of the two objects, while minimizing computation efforts.

According to another exemplary embodiment of the present invention as set forth in claim 6, an extended internal energy relating to vectorial difference of additional edges and approximately a distance between the two objects is introduced into the segmentation. A minimization of the internal energy with the extended internal energy allows to keep the spatial relationships of the two objects.

Claim 7 relates to an exemplary embodiment of an image processing device suitably adapted for executing the method according to the present invention. Advantageously, this image processing device allows a very accurate simultaneous segmentation while avoiding intersecting meshes and while avoiding a violation of spatial relationships of the objects.

Claim 8 relates to an exemplary embodiment of a computer program executing the method according to the present invention. Advantageously, this computer program allows for a simultaneous segmentation of multiple or composed objects, without the occurrence of intersecting meshes or a violation of spatial relationships between the objects.

It is the gist of the present invention, to include a priori knowledge concerning a spatial relationship of the two objects into the segmentation. For this, additional connections are introduced between vertices into a shape model which only contribute to the internal energy, but are not used to detect feature points and therefore do not contribute to the external energies. If, for example, the distance between two surfaces is approximately known, additional connections between these surfaces are introduced. Maintaining the length of these connections (i.e. minimizing an extended internal energy) will minimize the deviation of the original distance between the objects.

These and other aspects of the present invention will become apparent from and elucidated with reference to the embodiments described hereinafter.

Exemplary embodiments of the present invention will be described in the following, with reference to the following drawings.

Figure 1:
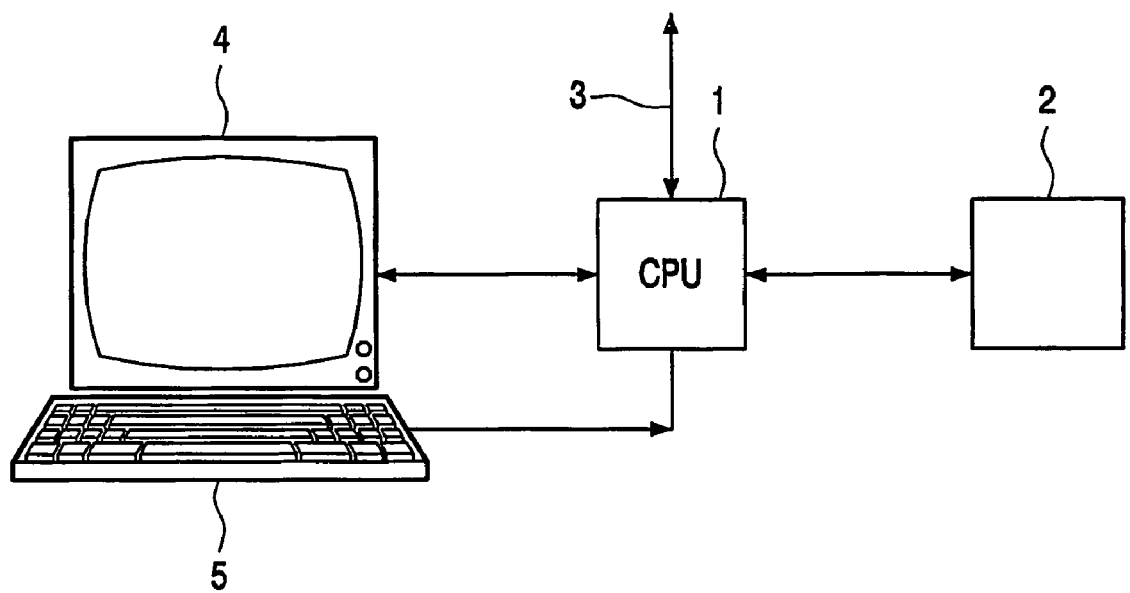
FIG. 1 shows a schematic representation of an image processing device according to an exemplary embodiment of the present invention adapted to execute a method according to an exemplary embodiment of the present invention.

FIG. 1 shows a simplified schematic representation of an exemplary embodiment of an image processing device in accordance with the present invention. In FIG. 1, there is shown a central processing unit (CPU) or image processor 1 for adapting a deformable model surface to surfaces of multiple or composed objects by mesh adaptation. Preferably, this adaptation is performed simultaneously for a plurality of objects in an image. The image processor 1 is connected to a memory 2 for storing the deformable surface model comprising a first and a second partial deformable surface model, and for storing the image depicting the objects of interest. The image processor 1 may be connected via a bus system 3 to a plurality of periphery devices or input/output devices which are not depicted in FIG. 1. For example, the image processor 1 may be connected to a MR device, a CT device, to a plotter or a printer or the like via bus system 3. Furthermore, the image processor 1 is connected to a display such as a computer screen 4 for outputting segmentation results or information. Furthermore, a keyboard 5 is provided, connected to the image processor 1, by which a user or operator may interact with the image processor 1 or may input data necessary or desired for the segmentation process.

Figure 2:
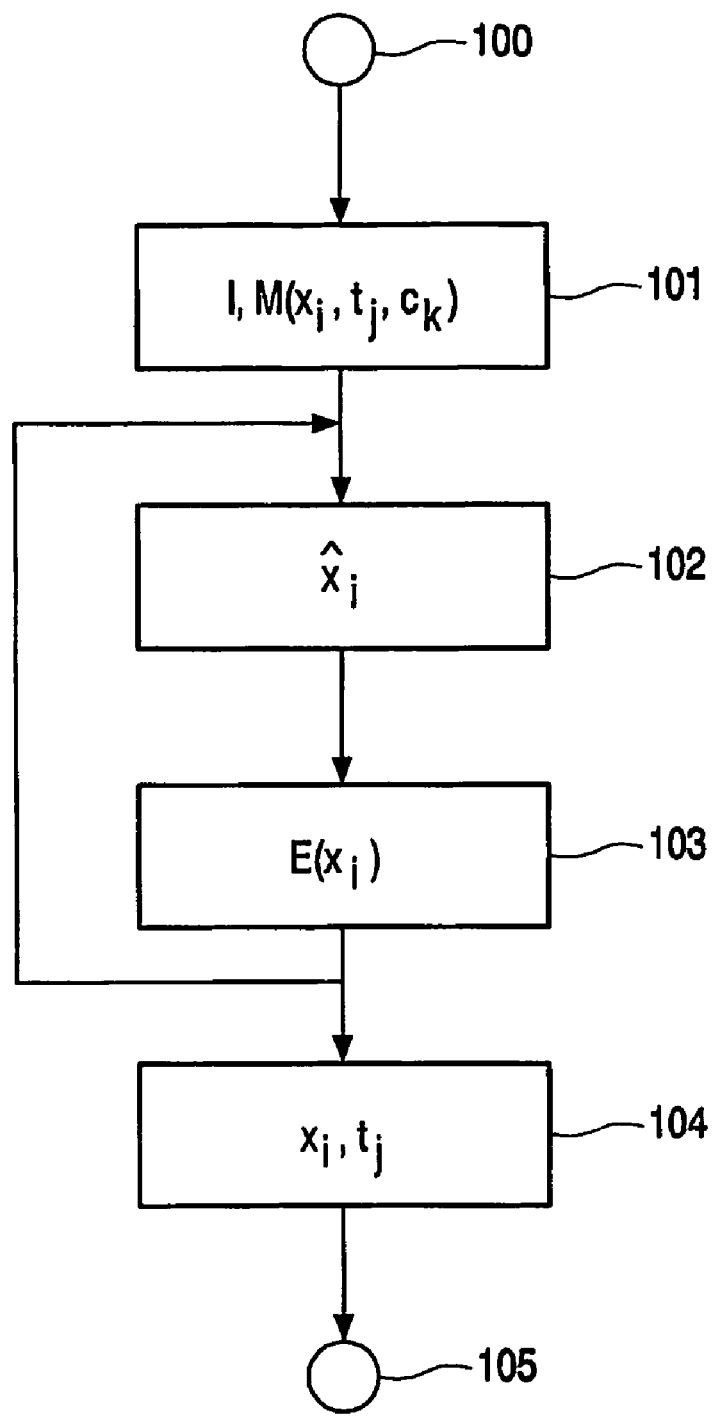
FIG. 2 shows a flow chart of an exemplary embodiment of a method according to the present invention.

FIG. 2 shows a flow chart of a method or computer program according to an exemplary embodiment of the present invention which is executed on an image processing device shown in FIG. 1.

After initialisation in step 100, in step 101, a deformable model M and an image I containing a structure of interest are loaded from the memory 2 into the image processor 1. Then, the model is coarsely placed over the object of interest in the image I. This can be done, e.g. by a user using the keyboard 5, a mouse or a similar interactive device, or a suitable automated initial placement method as known in the art.

Figure 3:
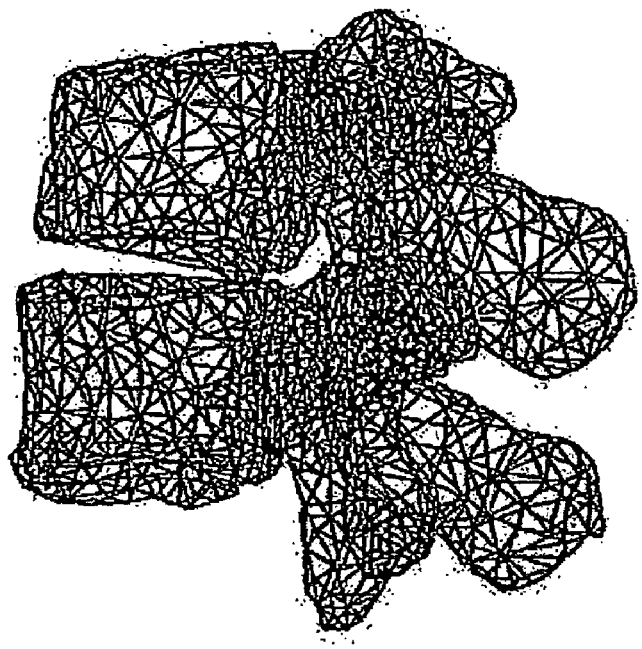
FIG. 3 shows a triangular surface model of two vertebrae of the spine for explaining an exemplary embodiment of the present invention.

The composed deformable model M represents surfaces of several anatomical objects and their spatial constellation. FIG. 3 shows an example of the surface model of two vertebrae. Here, the deformable surface model M comprises the first partial deformable surface model to be adapted to the surface of the first vertebra and the second partial deformable surface model to be adapted to the surface of the second vertebra. In spite of the fact that two vertebrae are depicted, other structures, like e.g. the femur and the hip, or the inner or outer wall of the heart ventricle are possible. In case, more than two objects are to be segmented simultaneously, a number of partial deformable surface models may be provided.

The depicted composed first and second partial deformable models consist of the surfaces of the two vertebrae. Each object is represented by a polygonal mesh. In the present example, vertices $x_i$ are connected by triangles tj. Nevertheless, other representations, such as simplex or general polygonal meshes are possible. Such a surface representation can be derived by a triangulation method of a single training object, as described, for example, in W. E. Lorensen, et al. "Marching cubes: A high resolution 3D surface construction algorithm" Computer Graphics, 21(3): 163-169, 1987.

Figure 4:
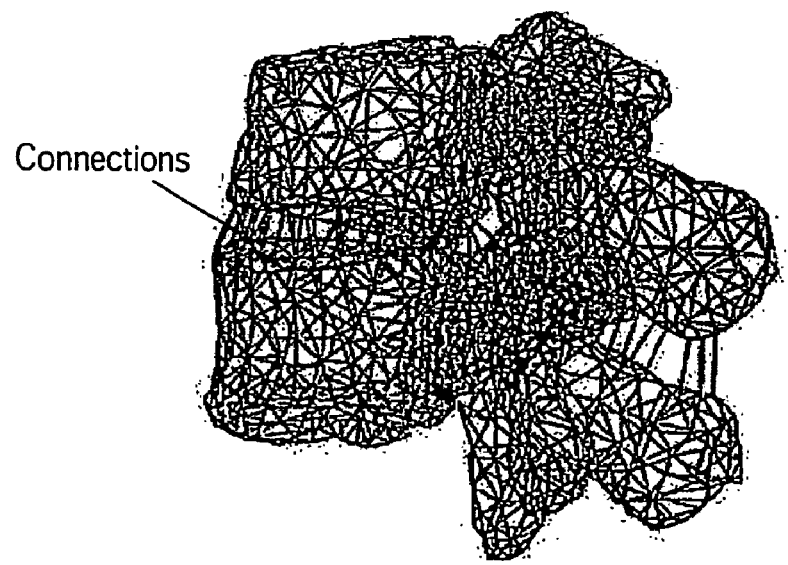
FIG. 4 shows two vertebrae with additional connections between upper and lower vertebra for explaining an exemplary embodiment of the present invention.

In FIG. 4, according to an exemplary embodiment of the present invention, a priori knowledge of the spatial relationship of the two vertebrae is included in the model. As shown in FIG. 4, the model was augmented with additional edges which connect vertices of the first vertebra with vertices on the second vertebra In FIG. 4, these additional dedicated connections between neighbouring triangles of the meshes of the two vertebrae are clearly visible between, e.g. the top endplate of the lower vertebra and the lower endplate of the top vertebra. These dedicated connections represent a priori knowledge of the spatial relationships between the objects. These connections between vertices of the neighbouring vertebrae are derived as follows:

Given two objects $O_1$ and $O_2$ (the two vertebrae) each with a set of vertices $x_{i1}$ and $x_{i2}$. For each vertex $x_{i1}$ of object $O_1$, the closest vertex $x_{i2}$ of object $O_2$ is searched. This results in a list of vertex pairs $\{(x_{01}, x_{1k1}), (x_{11}, x_{1k2}), \ldots\}$. For each vertex pair, a length $|x_{01} - x_{1k1}|$ is calculated and only those pairs with a length smaller than a certain threshold T are kept. This results in the fact, as shown in FIG. 4, that connections are only introduced between vertices which are not too far distanced from each other. As can be taken from FIG. 4, with the adjustment of the threshold T, connections are only introduced between neighbouring triangles of the two vertebrae. The resulting pairs are stored in the model as additional or "connection" triangles $c_k$, where point 0 and point 2 are the vertex $x_{01}$ of object $O_1$, and point 1 of the triangle is the corresponding vertex $x_{1k1}$ of object $O_2$. This is depicted in further detail in FIG. 5.

Figure 5:
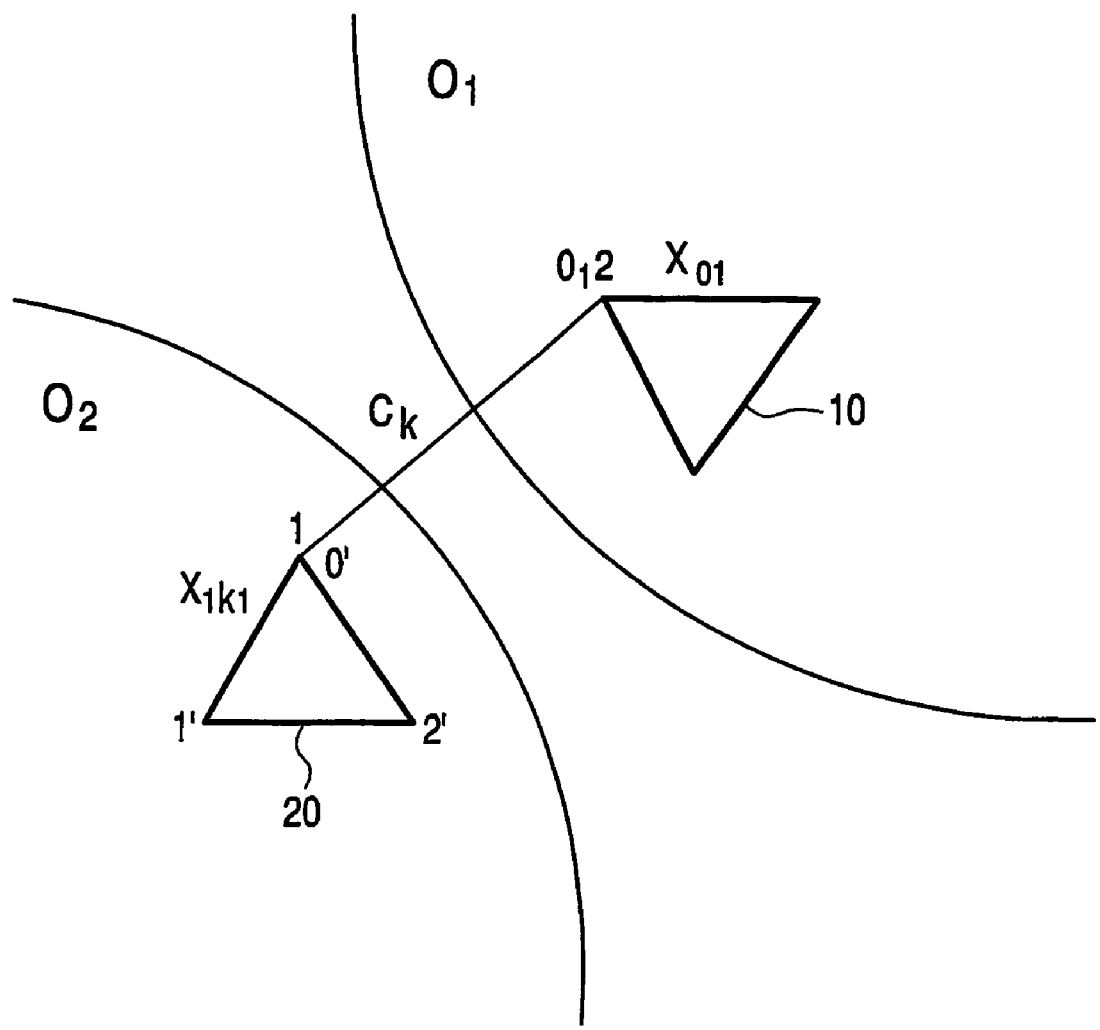
FIG. 5 shows a simplified drawing for explaining a featureless vertex connection in accordance with an exemplary embodiment of the present invention.

In FIG. 5, there is a first triangle 10 on the surface of object $O_1$ and a second triangle 20 on the surface of the object $O_2$. For the sake of clarity, only one triangle of the mesh is depicted for each object $O_1$ and $O_2$. As can be taken from FIG. 5, the vertex $x_{01}$ on the surface of object $O_1$ is connected with the vertex $x_{1k1}$ on the surface of object $O_2$. This connection is the additional or the "connection" triangle $c_k$. The triangle 20 shows a numbering of the corners of the triangle 20. The corner of the triangle 20 of the vertex $x_{1k1}$ is designated with 0', the lower corner on the left side is designated with 1' and the lower corner on the right side of the triangle 20 is designated with 2'. Using this way of numbering the corners of the triangle, it can be taken from FIG. 5 that the corners 0 and 2 of the triangle $c_k$ are the vertex $x_{01}$ and the corner 1 of the triangle $c_k$ is the vertex $x_{1k1}$. Due to this, the triangle has no surface. In other words, the connection triangle $c_k$ is a degenerated triangle, meaning that the edge between points 0 and 2 has a zero length, and the edge between points 0 and 1 is identical with the edge between points 2 and 1. Also, the edges between 0 and 1, respectively, 2 and 1 are at the same distance as the vertices $x_{O1}$ and $x_{1k1}$. Hence, in total, the model consists of a set of surface voxels $\{x_i\}$, a set of surface triangles $\{t_j\}$, and a set of connection triangles $\{c_k\}$. Accordingly, as may be taken form FIG. 4, in the deformable model, additional connection triangles between the upper and the lower vertebra were added to the surface triangles.

Having generated the composed deformable model and initialised the starting position in the image, an iterative adaptation procedure is carried out in steps 102 and 103. Here, the first and second partial deformable surface models are adapted to the first and second objects, i.e. the two vertebrae. The procedure iteratively varies the vertices coordinates so that they optimally fit the surface of the structure of interest, i.e. the two vertebrae.

To adapt the deformable surface model to the object in the image, the method of T. McInterney et al. may be used. However, preferably a modified method based on Weese et al. is used. For a better understanding, the modified method by Weese et al. is briefly summarized for single objects, and then the extension to multiple objects with connection triangles is explained.

Given an initial surface model of the object, each iteration consists of a feature detection step (step 102) and a mesh reconfiguration step (step 103). In step 102, for each of the triangles, a search along the triangle normal is carried out to find a point $\hat{x}_i$ that potentially lies on the boundary of the object in the image.

In step 103, the position of the mesh vertices are recalculated by energy minimization with respect to the vertex coordinates. The energy is a weighted sum of two terms, $$E = E_{ext} + \alpha E_{int} \qquad (1)$$

The external energy $E_{ext}$ drives the mesh vertices towards the surface elements associated with the detected feature points and can be calculated as in Weese et al.

The internal energy restricts the movement of the mesh vertices. Since the distribution of vertices on the initial template mesh is optimal with respect to surface-curvature, advantageously that distribution is maintained by punishing the change of distance between neighbouring vertices. Therefore, it is defined:

$$E_{int} = \sum_i^N \sum_{j=1, j \in t_i}^{V_i} \sum_{k \in N_t(j)} (\hat{x}_j - \hat{x}_k - sR\Delta_{jk})^2, \qquad (2)$$

where N is the number of objects, $t_i$ is the set of vertices belonging to the i-th object, $V_j$ is the number of vertices of the i-th object, $\hat{x}_k$ and $\hat{x}_j$ represent two neighboring vertices of the deformable mesh as found in step 102, and $\Delta_{jk}$ is the corresponding vectorial difference between vertex j and its neighbour k of a reference model. A scaling s and a rotation matrix R between the initial model and the deformed model are also estimated.

The result of this minimization are new vertex coordinates, which reflect a trade-off between being close to the surface points detected in the image and staying similar to the initial deformable model. From these new vertex coordinates new boundary points are searched for in step 102, and so forth. These two steps are iterated a fixed number of times, leading to a deformed model close to the surface of the object of interest.

In the following, the method of Weese et al. will be extended for the adaptation of composed deformable models. If the structure of interest is composed of several objects which are not connected but spatially related in a certain way, correct adaptation may become a problem. The spatial relationships may be violated during mesh reconfiguration, leading to meshes which are intersecting or too close to each other. One of the main reasons is that no information about the spatial coupling of the vertices of the different meshes is taken into account during adaptation in the known methods.

According to an exemplary embodiment of the present invention, in order to maintain certain spatial relationships between the meshes, "connections triangles" are introduced, in order to approximately maintain the distance between the two objects, or referring to the examples of FIGS. 3 and 4, to maintain the spatial relationships between the two vertebrae. As may be seen from the following, the spatial relationship is used during adaptation.

As described above, according to an exemplary embodiment of the present invention, additional connection triangles $c_k$, each of which connects a vertex of the lower vertebra to a vertex of the upper vertebra, are introduced. In order to approximately maintain the initial distances between the vertebrae, preferably, the initial configuration of the connection triangles is maintained. This can be done by adding an additional energy (see equation (1)), i.e.

$$\tilde{E} = E_{ext} + \alpha(E_{int} + E_{connections})$$

The purpose of $E_{connections}$ is to restrict the change of the connection triangles. The connection energy can be formulated as $$E_{connections} = \sum_i^N \sum_{j=1, j \in c_i}^{V_i} \sum_{k \in N_c(j)} (\hat{x}_j - \hat{x}_k - sR\Delta_{jk})^2, \qquad (4)$$

Here, only those vertices are considered which belong to a set of connection triangles $c_i$. Accordingly, only those vertex neighbours $N_c(j)$ are considered, which belong to the same connection triangle as the vertex $x_j$. $\Delta_{jk}$ is the vectorial distance between two points of a connection triangle.

It is important that only triangles are introduced, but no additional vertices (note that this it true because the additional triangles were generated from the available surface vertices). The internal energy $E_{int}$ and the connection energy $E_{connection}$ are combined into one internal energy $$\tilde{E}_{int} = E_{int} + E_{connections} = \sum_i^N \sum_{j=1, j \in c_i, t_i}^{V_i} \sum_{k \in N_c(j), N_t(j)} (\hat{x}_j - \hat{x}_k - sR\Delta_{jk})^2, \quad (5)$$

This leads to the new energy function of the composed deformable model $$\tilde{E} = E_{ext} + \alpha \tilde{E}_{int} \quad (6)$$

Then, the energy is minimized. Here it should be noted again that due to the fact that the connection triangles $c_k$ do not have a surface, no feature search is carried out in step 102 for the connection triangles $c_k$. Thus, a feature search is only carried out for the surface triangles $t_j$. This advantageously allows to minimize the computation efforts.

Then, for displaying the deformable model, the vertices $x_i$ and the triangles $t_j$ can be selected in step 104 and displayed on the computer screen 4. However, it should be noted that instead of displaying the entire deformed model, an output of the vertex coordinate numerically is also possible. Then, the method continues to step 105, where the method ends.

In brief, according to the present invention, the spatial relationship of objects is used during adaptation of the deformable surface model to the objects. Accordingly, due to the inclusion of additional connections to the vertices into the shape model, which vertices only contribute to the internal energy, but are not used to detect feature points, and therefore do not contribute to the external energies, spatial relationships between multiple or composed objects can be maintained very easily by minimizing the internal energy. This allows to accurately maintain spatial relationships between objects which are simultaneously segmented. In particular, the danger is prevented that spatial relationships between objections are violated and that the composed deformable models intersect each other. A segmentation of multiple objects at the same time also improves the robustness and speed of segmentation using deformable models.

The invention claimed is:

1. Method for the simultaneous segmentation of multiple or composed objects in an image, wherein a deformable surface model is to be adapted to a first surface of a first object and a second surface of a second object and wherein the deformable surface model comprises a first partial deformable surface model and a second partial deformable surface model, comprising acts of:
   (a) applying the first partial deformable surface model describing a structure of the first surface of the first object;
   (b) applying the second partial deformable surface model describing a structure of the second surface of the second object, wherein the first partial deformable surface model and the second partial deformable surface model have a prescribed spatial relationship corresponding to distances between portions of the first object and portions of the second object; and
   (c) adapting the first partial deformable model to the first surface and the second partial deformable model to the second surface, wherein the prescribed spatial relationship of the first partial deformable surface model and the second partial deformable surface model is used for the adaptation.

2. Method according to claim 1, wherein the spatial relationship of the first partial deformable surface model and the second partial deformable surface model is prescribed by means of an additional edge, which connects a first vertex of the first partial deformable surface model with a second vertex of the second partial deformable surface model.

3. Method according to claim 2, wherein the additional edge is a featureless vertex connection.

4. Method according to claim 1, wherein the first and second partial deformable surface models each comprise a mesh with a plurality of surface elements, further comprising acts of:
   detecting feature points for the surface elements at the first and second surfaces of the first and second objects; and
   recalculating coordinates of the surface elements of the mesh to represent the feature points.

5. Method according to claim 4, wherein the recalculation act comprises acts of:
   minimizing a distance between the feature points and the surface elements; and
   minimizing an internal energy of the first and second partial deformable surface models.

6. Method according to claim 5, wherein the internal energy comprises an extended internal energy relating to a difference of a length of the additional edge and a distance between the first and second partial deformable models.

7. Image processing device, comprising:
   a memory for storing a deformable surface model comprising a first deformable surface model and a second deformable surface model and for storing an image depicting a first object and a second object; and
   an image processor for adapting the deformable surface model to a first surface of the first object and a second surface of the second object, which processor is configured to perform the following operation:
   (a) applying the first partial deformable surface model describing a structure of the first surface of the first object;
   (b) applying the second partial deformable surface model describing a structure of the second surface of the second object, wherein the first partial deformable surface model and the second partial deformable surface model have a prescribed spatial relationship corresponding to distances between portions of the first object and portions of the second object; and
   (c) adapting the first partial deformable model to the first surface and the second partial deformable model to the second surface, wherein the prescribed spatial relationship of the first partial deformable surface model and the second partial deformable surface model is used for the adaptation.

8. Computer program stored on a computer readable medium for an image processing device, the computer program being configured to adapt a deformable surface model comprising a first partial deformable surface model and a second partial deformable surface model to a first surface of a first object and a second surface of a second object, the computer program comprising programming portions configured to:
   (a) apply the first partial deformable surface model describing a structure of the first surface of the first object;
   (b) apply the second partial deformable surface model describing a structure of the second surface of the second object, wherein the first partial deformable surface model and the second partial deformable surface model have a prescribed spatial relationship corresponding to distances between portions of the first object and portions of the second object; and (c) adapt the first partial deformable model to the first surface and the second partial deformable model to the second surface, wherein the prescribed spatial relationship of the first partial deformable surface model and the second partial deformable surface model is used for the adaptation.

9. Method according to claim 4, wherein the portions of the first and second objects correspond to the detected feature points and wherein the distances between the portions of the first object and the portions of the second object correspond to distances between the feature points of the first and second objects.

10. Method according to claim 9, comprising an act of deleting distances that are larger than a threshold, wherein the act of adapting is performed utilizing distances that are not deleted.

11. Computer program according to claim 8, wherein the portions of the first and second objects correspond to the detected feature points and wherein the distances between the portions of the first object and the portions of the second object correspond to distances between the feature points of the first and second objects.

12. Computer program according to claim 11, comprising a programming portion configured to delete distances that are larger than a threshold, wherein the portion configured to adapt is configured to adapt the first partial deformable model to the first surface and the second partial deformable model to the second surface utilizing distances that are not deleted.

13. Computer program according to claim 8, wherein the first and second partial deformable surface models each comprise a mesh with a plurality of surface elements, the computer program comprising programming portions configured to:

detect feature points for the surface elements at the first and second surfaces of the first and second objects; and recalculate coordinates of the surface elements of the mesh to represent the feature points.

14. Computer program according to claim 13, wherein the surface elements correspond to triangles.

15. Computer program according to claim 14, wherein the distances between portions of the first object and portions of the second object represent distances between vertices of triangles at the first and second surfaces of the first and second objects.

16. Computer program according to claim 13, wherein the portion configured to recalculate comprises programming portions configured to:

minimize a distance between the feature points and the surface elements; and minimize an internal energy of the first and second partial deformable surface models.

17. Computer program according to claim 16, wherein the internal energy comprises an extended internal energy relating to a difference of a length of the additional edge and a distance between the first and second partial deformable models.

18. Computer program according to claim 8, the computer program comprising a programming portion configured to calculate the distances by searching for a shortest distance between vertices of the triangles at the first and second surfaces of the first and second objects.

* * * * *